(12) United States Patent
His et al.

(10) Patent No.: US 11,390,786 B2
(45) Date of Patent: Jul. 19, 2022

(54) SINTERED PRODUCT WITH HIGH IRON OXIDE CONTENT

(71) Applicant: SAINT-GOBAIN CENTRE DE RECHERCHES ET D'ETUDES EUROPEEN, Courbevoie (FR)

(72) Inventors: Christian His, Cavilion (FR); Franceline Villermaux, Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 31 days.

(21) Appl. No.: 16/094,039

(22) PCT Filed: Apr. 19, 2017

(86) PCT No.: PCT/EP2017/059273
§ 371 (c)(1),
(2) Date: Oct. 16, 2018

(87) PCT Pub. No.: WO2017/182514
PCT Pub. Date: Oct. 26, 2017

(65) Prior Publication Data
US 2019/0127622 A1   May 2, 2019

(30) Foreign Application Priority Data
Apr. 19, 2016  (FR) ...................... 1653467

(51) Int. Cl.
| C09K 5/14 | (2006.01) |
| F28D 20/00 | (2006.01) |
| C04B 35/36 | (2006.01) |
| C04B 35/26 | (2006.01) |
| F28D 17/02 | (2006.01) |
| F28D 17/00 | (2006.01) |
| C04B 35/634 | (2006.01) |

(52) U.S. Cl.
CPC ............... *C09K 5/14* (2013.01); *C04B 35/26* (2013.01); *C04B 35/2683* (2013.01); *F28D 17/005* (2013.01); *F28D 17/02* (2013.01); *F28D 20/0056* (2013.01); *C04B 35/63488* (2013.01); *C04B 2235/3208* (2013.01); *C04B 2235/3217* (2013.01); *C04B 2235/3232* (2013.01); *C04B 2235/3272* (2013.01); *C04B 2235/3418* (2013.01); *C04B 2235/5436* (2013.01); *C04B 2235/604* (2013.01); *C04B 2235/6562* (2013.01); *C04B 2235/6565* (2013.01); *C04B 2235/77* (2013.01); *C04B 2235/782* (2013.01); *C04B 2235/785* (2013.01); *C04B 2235/786* (2013.01); *C04B 2235/9607* (2013.01); *Y02E 60/14* (2013.01)

(58) Field of Classification Search
CPC ......... C09K 5/14; C04B 14/308; C04B 35/26; C04B 35/2683; C04B 2235/3208; C04B 2235/3217; C04B 2235/3232; C04B 2235/3272; C04B 2235/3274; C04B 2235/3418; C04B 2235/5427; C04B 2235/5436; C04B 2235/604; C04B 2235/65; C04B 2235/656; C04B 2235/6562; C04B 2235/6565; C04B 2235/77; C04B 2235/782; C04B 2235/785; C04B 2235/786; C04B 2235/9607; C01G 49/06; C03B 5/43; F27D 1/0006; F28D 17/00; F28D 17/005; F28D 17/02; F28D 19/02; F28D 20/0052; F28D 20/0056; F28D 20/023
See application file for complete search history.

(56) References Cited

U.S. PATENT DOCUMENTS

| 2014/0144603 A1* | 5/2014 | Watremetz | ............. F28D 17/02 165/10 |
| 2014/0158318 A1* | 6/2014 | Watremetz | ............. F28D 17/02 165/10 |

FOREIGN PATENT DOCUMENTS

| EP | 3015439 A1 | 5/2016 | | |
| FR | 2977660 A1 | 1/2013 | | |
| FR | 2988168 A1 | 9/2013 | | |
| FR | 3026473 A1 | 4/2016 | | |
| WO | WO-2004063652 A2 * | 7/2004 | ........... C04B 41/009 |
| WO | 2013005196 A1 | 1/2013 | | |
| WO | WO-2013005196 A1 * | 1/2013 | ........... F28D 17/005 |
| WO | 2013093819 A2 | 6/2013 | | |

OTHER PUBLICATIONS

Corresponding International Application, Application No. PCT/EP2017/059273, Search Report, dated Jun. 9, 2017, 6 Pgs.

* cited by examiner

*Primary Examiner* — Matthew R Diaz
(74) *Attorney, Agent, or Firm* — Ronald M. Kachmarik; Cooper Legal Group LLC (57) ABSTRACT

A sintered material exhibiting the following chemical composition, as percentages by weight: iron oxide(s), expressed in the $Fe_2O_3$ form, ≥85%, CaO: 0.1%-6%, $SiO_2$: 0.1%-6%, 0.05% ≤$TiO_2$, 0≤$Al_2O_3$, $TiO_2$+$Al_2O_3$≤3%, and constituents other than iron oxides, CaO, $SiO_2$, $TiO_2$ and $Al_2O_3$: ≤5%. The CaO/$SiO_2$ ratio by weight is between 0.2 and 7. The $TiO_2$/CaO ratio by weight is between 0.2 and 1.5.

15 Claims, 1 Drawing Sheet

SINTERED PRODUCT WITH HIGH IRON OXIDE CONTENT

TECHNICAL FIELD

The invention relates to a sintered material intended for the manufacture of particles, themselves intended for the manufacture of a sintered product, The sintered refractory product is in particular intended to constitute energy storage elements in a heat energy storage unit, known as "thermal storage unit".

STATE OF THE ART

A thermal installation may comprise a unit which produces heat energy, a consumer of heat energy and unit for storing this heat energy. The storage of heat energy makes it possible to offset in time its production and its consumption.

The storage of heat energy is also of use for taking economic advantage of soft energies, such as solar energy, which are renewable but the production of which is intermittent. The storage of the energy may also be of use in taking advantage of the differences in the price of electricity between the "off-peak" hours, during which the electricity tariffs are lowest, and the "peak" hours, during which the tariffs are highest.

For example, in the case of storage of energy by air compression, generating heat energy which is stored in a thermal storage unit, the electricity-consuming compression phases are advantageously carried out at lower cost during the off-peak hours, while the electricity-producing expansion phases are carried out during the peak hours, in order to provide electricity which may be injected into the power grid, according to demand, at an advantageous tariff.

The heat energy may be stored in heat energy storage elements of a thermal storage unit. The energy storage elements may be loose (media) in the form of a bed (packed bed), for example a bed of pebbles, or be stacked in an ordered manner, conventionally in the form of a stack of bricks.

Sintered energy storage elements, having a high iron oxide content, are known in particular.

The storage operation, by heat exchange between a stream of heat-exchange fluid and the thermal storage unit, is conventionally called "charging", the heat-exchange fluid entering the thermal storage unit during charging being known as "charging heat-exchange fluid".

The storage capacity is in particular dependent on the chemical composition, the relative density, the amount of energy storage material per unit of volume and the specific heat capacity of the energy storage material. Typically, in order to have available a sufficient capacity, the void volume fraction is less than or equal to 60%, unlike regenerators and in particular regenerators used in the glass industry.

The heat energy stored may subsequently be restored, by heat exchange between a stream of heat-exchange fluid and the energy storage elements. This operation is conventionally called "discharging", the heat-exchange fluid entering the thermal storage unit during discharging being known as "discharging heat-exchange fluid".

The paper "A review on packed bed solar energy storage systems", Renewable arid Sustainable Energy Reviews, 14 (2010), pp 1059-1069, describes the state of the art in the field of thermal storage units and in particular the influence of certain parameters on the efficiency of said thermal storage units.

There exists an ongoing need to improve the efficiency of a thermal storage unit. This need is all the more palpable as environmental regulations arid concern for controlling expenditures are prompting industries always to seek further energy savings.

One aim of the invention is to meet this need, at least partially.

SUMMARY OF THE INVENTION

The invention provides a sintered material exhibiting the following chemical composition, as percentages by weight:
- iron oxide(s), expressed in the $Fe_2O_3$ form, 85%
- CaO: 0.1%-6%, and
- $SiO_2$: 0.1%-6%, and
- $0.05\% \leq TiO_2$, and
- $0 \leq Al_2O_3$, and
- $TiO_2 + Al_2O_3 \leq 3\%$, and
- constituents other than iron oxides, CaO, $SiO_2$, $TiO_2$ and $Al_2O_3$: ≤5%, the $CaO/SiO_2$ ratio by weight being between 0.2 and 7, the $TiO_2/CaO$ ratio by weight being between 0.2 and 1,5.

As will be seen in more detail in the continuation of the description, a sintered material according to the invention exhibits high apparent and relative densities. It is thus perfectly suited to the manufacture of particles and of a particulate mixture intended for the manufacture of an energy storage element (or "particulate mixture according to the invention"). In particular, it is perfectly suited to the manufacture of the coarse fraction of such a particulate mixture.

The material preferably exhibits one or more of the following optional characteristics:
- the material exhibits a relative density of greater than or equal to 90%;
- the material exhibits a mean grain size preferably of less than 100 μm and greater than 0.5 μm;
- the material exhibits:
  - a content of iron oxide, expressed in the $Fe_2O_3$ form, of greater than 88%; and/or
  - a content of CaO of greater than 0.2% and less than 4%; and/or
  - a content of $SiO_2$ of greater than 0.2% and less than 6%; and/or
  - a content of $TiO_2$ of greater than 0.1% and less than 3%; and/or
  - a content of $Al_2O_3$ of greater than 0.1% and less than 2.5%; and/or
  - a total content of $TiO_2+Al_2O_3$ of greater than 0.2% and less than 2.5%; and/or
  - a $CaO/SiO_2$ ratio by weight of greater than 0.4 and less than 6.5; and/or
  - a $TiO_2/CaO$ ratio by weight of greater than 0.3 and less than 1.4; and/or
  - a content of constituents other than iron oxides, CaO, $SiO_2$, $TiO_2$ and $Al_2O_3$ of less than 4%; and/or
  - a content of manganese oxide, expressed in the MnO form, of greater than 0.1% and less than 3%;
- the material exhibits:
  - a content of iron oxide, expressed in the $Fe_2O_3$ form, of greater than 92%; and/or
  - a content of CaO of greater than 0.3% and less than 2%; and/or
  - a content of $SiO_2$ of greater than 0.4% and less than 3%; and/or
  - a content of $TiO_2$ of greater than 0.3% and less than 2.5%; and/or a content of Al$_2$O$_3$ of less than 1.5%; and/or
a total content of TiO$_2$+Al$_2$O$_3$ of greater than 0.3% and less than 2%; and/or
a CaO/SiO$_2$ ratio by weight of less than 5; and/or
a TiO$_2$/CaO ratio by weight of greater than 0.5 and less than 1.3; and/or
a content of constituents other than iron oxides, CaO, SiO$_2$, TiO$_2$ and Al$_2$O$_3$ of less than 2%; and/or
a content of manganese oxide, expressed in the MnO form, of greater than 0.2% and less than 2%;

the material exhibits:
a content of iron oxide, expressed in the Fe$_2$O$_3$ form, of greater than 92%; and
a content of CaO of greater than 0,3% and less than 2%; and
a content of SiO$_2$ of greater than 0.4% and less than 3%; and
a content of TiO$_2$ of greater than 0,3% and less than 2.5%; and
a content of Al$_2$O$_3$ of less than 1.5%; and
a total content of TiO$_2$+Al$_2$O$_3$ of greater than 0.3% and less than 2%; and
a CaO/SiO$_2$ ratio by weight of less than 5; and
a TiO$_2$/CaO ratio by weight of greater than 0.5 and less than 1,3; and a content of constituents other than iron oxides, CaO, SiO$_2$, TiO$_2$ and Al$_2$O$_3$ of less than 2%; and
a content of manganese oxide, expressed in the MnO form, of greater than 0.2% and less than 2%;

the material exhibits:
a content of iron oxide, expressed in the Fe$_2$O$_3$ form, of greater than 95%; and/or
a content of CaO of less than 1%; and/or
a content of SiO$_2$ of greater than 0.7% and less than 2%; and/or
a content of Ti$_2$ of greater than 0.5% and less than 2%; and/or
a content of Al$_2$O$_3$ of less than 1%; and/or
a total content of TiO$_2$ Al$_2$O$_3$ of greater than 0.4%; and/or
a CaO/SiO$_2$ ratio by weight of less than 3; and/or
a TiO$_2$/CaO ratio by weight of greater than 0,7 and less than 1.2; and/or
a content of constituents other than iron oxides, CaO, SiO$_2$, TiO$_2$ and Al$_2$O$_3$ of less than 1%; and/or
a content of manganese oxide, expressed in the MnO form, of greater than 0.4% and less than 1%;

the material exhibits:
a content of iron oxide, expressed in the Fe$_2$O$_3$ form, of greater than 95%; and
a content of CaO of less than 1%; and
a content of SiO$_2$ of greater than 0.7% and less than 2%; and
a content of TiO$_2$ of greater than 0.5% and less than 2%; and
a content of Al$_2$O$_3$ of less than 1%; and
a total content of TiO$_2$+Al$_2$O$_3$ of greater than 0.4%; and
a CaO/SiO$_2$ ratio by weight of less than 3; and
a TiO$_2$/CaO ratio by weight of greater than 0.7 and less than 1.2; and
a content of constituents other than iron oxides, CaO, SiO$_2$, TiO$_2$ and Al$_2$O$_3$ of less than 1%; and
a content of manganese oxide, expressed in the MnO form, of greater than 0.4% and less than 1%.

The material according to the invention may in particular be provided in the form of a particle, referred to as "particle according to the invention".

The invention also relates to a powder, referred to as "powder according to the invention", comprising more than 90%, preferably more than 95%, preferably substantially 100%, by weight, of particles according to the invention.

A particulate mixture according to the invention comprises, as percentages by weight;
(a) more than 60%, by weight, of particles exhibiting a size of greater than or equal to 50 μm, or "aggregate particles", more than 90% by weight of said aggregate particles being particles made of a material according to the invention;
(b) more than 15%, by weight, of particles exhibiting a size of less than 50 μm, or "matrix particles";
the particulate mixture comprising more than 5% by weight of aggregate particles exhibiting a size of greater than 1 mm and preferably of less than 15 mm.

A particulate mixture according to the invention may also exhibit one or more of the following optional characteristics:
more than 60%, preferably more than 90%, of the particles of the particulate mixture are made of a material according to the invention, as percentage by weight;
in one embodiment, the matrix fraction, formed of the matrix particles, exhibits the following chemical analysis, as percentages by weight based on the oxides of the matrix fraction:
iron oxide(s), expressed in the Fe$_2$O$_3$ form, 85%, CaO≤6%, and
SiO$_2$; 0.1%-6%, and
TiO$_2$; 0.1%-6%, and
Al$_2$O$_3$≤2%, and
other oxides: ≤5%,
the CaO/SiO$_2$ ratio by weight being less than 1, and
the CaO/TiO$_2$ ratio by weight being less than 1;
in one embodiment, the matrix fraction, formed of the matrix particles, exhibits the following chemical analysis, as percentages by weight based on the oxides of the matrix fraction:
iron oxide(s), expressed in the Fe2O$_3$ form, 85%, CaO: 0.1%-6%, and
SO$_2$: 0.1%-6%, and
0.05%<TiO$_2$, and
0≤Al$_2$O$_3$, and
TiO$_2$+Al$_2$O$_3$≤3%, and
other oxides ≤5%,
the CaO/SiO$_2$ ratio by weight being between 0.2 and 7, and
the TiO$_2$/CaO ratio by weight being between 0.2 and 1.

The invention also relates to a process for the manufacture of a particulate mixture according to the invention by mixing a powder according to the invention with other particulate starting substances.

The invention also relates to a process for the manufacture of a sintered refractory product, referred to as "sintered product according to the invention", said process comprising the following successive stages:
A) preparation of a starting feedstock by mixing a particulate mixture according to the invention and water:
B) shaping said starting feedstock so as to form a preform;
C) sintering said preform so as to obtain said sintered product, The invention also relates to a sintered product obtained by sintering a particulate mixture according to the invention, in particular following stages A) to C) above, The invention also relates to a thermal storage unit comprising heat energy storage elements, preferably loose and/or in the form of parts stacked in an ordered manner, said heat energy storage elements being made of a sintered refractory product according to the invention.

Preferably, the thermal storage unit according to the invention comprises more than 50%, preferably more than 90%, by number of heat energy storage elements made of a sintered product according to the invention, based on the number of heat energy storage elements. Preferably, substantially all the heat energy storage elements of the thermal storage unit according to the invention are made of a sintered product according to the invention.

Preferably, the heat energy storage elements of the thermal storage unit are shaped and arranged so that said thermal storage unit exhibits a void volume fraction of less than or equal to 60%, preferably of less than or equal to 50%, preferably of less than or equal to 40%, preferably of less than or equal to 30%, preferably of less than or equal to 25%, indeed even of less than or equal to 20% and/or of greater than or equal to 10%, preferably of greater than or equal to 15%.

The invention further relates to an assembly comprising:
a thermal storage unit according to the invention, and
a device for circulation of a heat-exchange fluid through said thermal storage unit,
Preferably, the circulation device provides:
during a charging phase, the circulation of a charging heat-exchange fluid through said thermal storage unit, and
during a discharging phase, the circulation of a discharging heat-exchange fluid through said thermal storage unit,
at least one of said charging and discharging heat-exchange fluids, preferably both charging and discharging heat-exchange fluids, preferably circulating through the thermal storage unit from a lower pipe toward at least one upper pipe.

The invention also relates to a thermal installation comprising:
a unit producing heat energy, for example a furnace, a solar tower or a compressor, and
an assembly according to the invention, the circulation device of said assembly providing, during a charging phase, the circulation of the charging heat-exchange fluid from the unit producing heat energy as far as the thermal storage unit, and then through said thermal storage unit,.

Preferably, a thermal installation according to the invention comprises a consumer of heat energy, said circulation device providing, during the discharging phase, the circulation of the discharging heat-exchange fluid through said thermal storage unit and then, from said thermal storage unit, as far as the consumer of heat energy.

BRIEF DESCRIPTION OF THE FIGURES

Other subject matters, aspects, properties and advantages of the present invention will become more clearly apparent in the light of the description and of the examples which follow and on examining the appended drawing, in which.

DEFINITIONS

The term "thermal installation" is to be understood in the broad sense as meaning any installation comprising a unit producing heat energy.

The term "unit producing heat energy" is considered to mean not only units which are specifically provided in order to generate heat energy, such as a solar tower, but also units which, by their operation, generate heat energy, for example a compressor.

The term "consumer of heat energy" denotes an element capable of receiving heat energy. There may in particular result therefrom an increase in the temperature of the consumer (for example in the case of heating of a building) and/or a conversion into mechanical energy (for example in a gas turbine).

A powder or a particulate mixture are dry assemblies of particles not bonded to one another. The percentages relating to a particulate mixture or to a powder are thus implicitly based on the dry matter.

The term "particle" is understood to mean a solid object, the size of which is less than 30 mm. The particles exhibiting a size of greater than or equal to 50 known as "coarse particles" or "aggregate particles", and those exhibiting a size of less than 50 μm, known as "fine particles" or "matrix particles", are distinguished in particular. The assembly of coarse particles constitutes the "coarse fraction" or "aggregate". The assembly of matrix particles constitutes the "fine fraction" or "matrix fraction".

The term "sintering" refers to the consolidation, by heat treatment at more than 1100° C., of a preform with possible partial or complete melting of some of its constituents (but not of all its constituents, so that the preform is not converted into a liquid mass).

The invention relates to two types of sintered substances, namely the sintered material according to the invention, which is used in particular in the manufacture of sintered particles according to the invention, and the sintered product obtained by sintering these particles, For the sake of clarity, different terms have been used for these two substances:

For the sintered material according to the invention, the preform is the result of a shaping of a mixture of powders, and the sintering results in a consolidation binding the "grains" together.

For the sintered product according to the invention, the preform is the result of a shaping of a "particulate mixture" according to the invention and the sintering results in the conversion of the "matrix fraction" into a binding, or "matrix", phase which will bind together the "coarse particles" (substantially unaffected by the sintering), The term "aggregates" refers to the coarse particles bonded by the matrix, The size of the particles of a powder or of a particulate mixture is evaluated conventionally by a characterization of particle size distribution carried out with a laser particle sizer for the fraction of the particles passing through a square-mesh sieve with an opening of 50 μm and, for the oversize of said sieve, by sieving using square-mesh sieves, The laser particle sizer may, for example, be a Partica LA-950 from Horiba. The coarse particles substantially retain their dimensions and their morphology during the sintering and thus correspond substantially to the grains of the sintered product.

The 10 ($A_{10}$), 50 ($A_{50}$), 90 ($A_{90}$) and 99.5 ($A_{99.5}$) percentiles or "centiles" and more generally the "n" $A_n$ percentiles or "centiles"of a property A of a population, for example of a population of particles, are the values of this property corresponding to the percentages of 10%, 50%, 90%, 99.5% and n %, respectively, on the cumulative distribution curve relating to this property, the values relating to this property being classified by increasing order, In particular, the $D_n$ percentiles relate to sizes of particles of a powder or of a particulate mixture. The percentages are by weight.

For example, 10% by weight of the particles of the powder have a size of less than $D_{10}$ and 90% of the particles by weight have a size of greater than or equal to $D_{10}$. The percentiles relating to the size of the particles may be determined using a particle size distribution produced using a laser particle sizer and/or sieving operations.

The 50 percentile is conventionally known as the "median" percentile. For example, the $D_{50}$ percentile is conventionally known as "median size".

The term "absolute density" of a material is understood to mean, conventionally, the ratio equal to the weight of dry matter of said material, measured after grinding to a fineness such that substantially no closed pores remain, divided by the volume of this weight after grinding. It may be measured by helium pycnometry.

The term "apparent density" of a material or of a sintered product is understood to mean, conventionally, the ratio equal to the weight of said material or sintered product divided by the volume occupied by said material or said sintered product.

The term "relative density" of a material is understood to mean the ratio equal to the apparent density of said material divided by the absolute density of said material, expressed as percentage.

The "void volume fraction" is the ratio of the void volume to the general volume occupied by the assembly of the energy storage elements of the thermal storage unit.

The general volume occupied by the assembly of the energy storage elements is the volume of the casing of this assembly. Thus, when the interior volume of the thermal storage unit is filled with energy storage elements, the general volume occupied by the assembly of the energy storage elements is equal to the interior volume of the thermal storage unit.

The void volume is conventionally defined as the difference between the general volume occupied by the assembly of the elements of the thermal storage unit and the sum of the volumes of each of said elements, the volume of an element being determined while being unaware of its porosity.

Unless otherwise indicated, when a percentage is expressed "based on the oxides", as is conventional in refractory materials, the content by weight of a constituent is conventionally expressed in the form of the most stable oxide.

The term "containing a" or "comprising a" is understood to mean a nonexclusive inclusion, unless otherwise indicated.

The various characteristics of a material according to the invention may be determined by the characterization methods used for the examples below.

DETAILED DESCRIPTION

Figure 1:
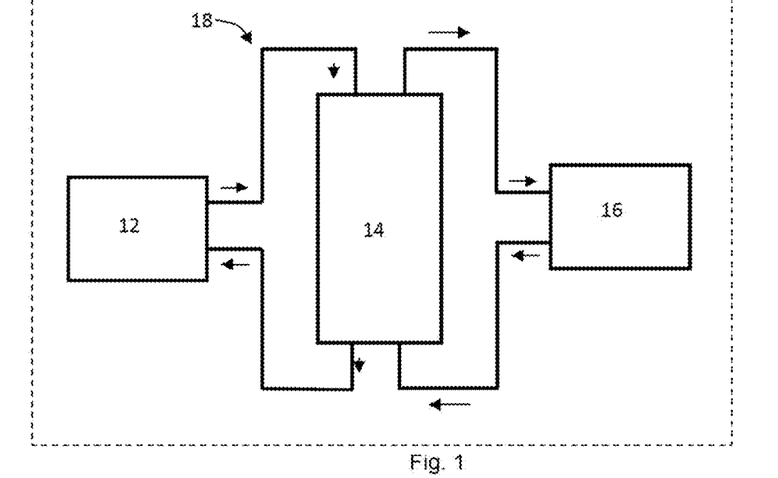
FIG. 1 diagrammatically represents a thermal installation according to the invention.

The thermal installation 10 according to the invention represented in FIG. 1 comprises a unit producing heat energy 12, a thermal storage unit 14, a consumer of heat energy 16 and a circulation device 18.

The unit producing heat energy 12 may, for example, be a furnace, a solar tower or a compressor. Preferably, the unit producing heat energy produces more than 50 kWh, or more than 100 kWh, indeed even more than 300 kWh, indeed even more than 1 MWh, indeed even more than 5 MWh, of heat energy.

The consumer of heat energy 16 may, for example, be a building or a collection of buildings, a tank, a pool, a turbine coupled to an alternator in order to generate electricity, a steam-consuming industrial installation, for example the industry for the manufacture of paper pulp, or a steam boiler.

The circulation device 18 conventionally comprises an assembly of pipes, valves and pumps/ventilators/extractors controlled so as to be able to selectively bring the thermal storage unit into communication:
with the unit producing heat energy 12, so that it may receive a charging heat-exchange fluid exiting from said unit, during the charging phases, and
with the consumer of heat energy 16, so that the reheated discharging heat-exchange fluid exiting from the thermal storage unit may reheat said consumer, or more generally transfer heat energy to said consumer, during the discharging phases,
and so as to be able to force the circulation of the charging heat-exchange fluid and/or of the discharging heat-exchange fluid through the thermal storage unit 14.

The charging and discharging heat-exchange fluids may be of the same or different natures.

The heat-exchange fluid employed for the charging and/or discharging of the thermal storage unit may be a gas, for example air, steam or a heat-exchange gas, or be a liquid, for example water, a thermal oil, molten salts or molten metals or alloys.

Figure 2:
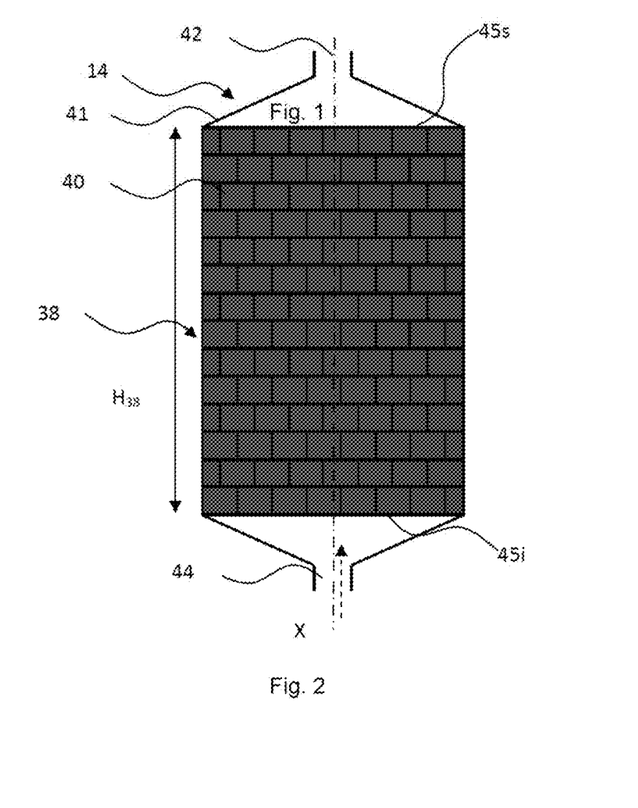
FIG. 2 diagrammatically represents a thermal storage unit according to the invention.

FIG. 2 represents an example of thermal storage unit 14. This thermal storage unit comprises a stack 38 of, preferably substantially vertical, longitudinal axis X, The stack 38, formed of bricks 40, is positioned in a chamber 41, for example made of metal or of ceramic material, exhibiting an upper orifice 42 and a lower orifice 44 through which, preferably, the charging and discharging heat-exchange fluids, respectively, enter the thermal storage unit. Preferably, the charging and discharging heat-exchange fluids exit from the thermal storage unit 14 through the lower orifice 42 and the upper orifice 44, respectively.

The height $H_{33}$ of the stack 38, between its upper face 45s and its lower face 45i, is preferably greater than 1 m, preferably greater than 5 m, preferably greater than 15 m, preferably greater than 25 m, indeed even greater than 35 m, indeed even greater than 50 m.

The weight of the stack 38 is preferably greater than 1 T, preferably greater than 10 T, indeed even greater than 100 T, indeed even greater than 500 T, indeed even greater than 700 T, indeed even greater than 2000 T, indeed even greater than 4000 T, indeed even greater than 5000 T, indeed even greater than 7000 T, Material A material according to the invention preferably exhibits:
a content of iron oxide, expressed in the $Fe_2O_3$ form, of greater than 88%, preferably of greater than 90%, preferably of greater than 92%, preferably of greater than 94%, preferably of greater than 95%, preferably of greater than 96%, preferably of greater than 97%, which advantageously improves the apparent density of the material; and/or
a content of CaO of greater than 0.2%, indeed even of greater than 0.3%, and/or of less than 4%, preferably of less than 3%, preferably of less than 2%, preferably of less than 1%; and/or
a content of $SiO_2$ of greater than 0.2%, preferably of greater than 0.4%, preferably of greater than 0.5%, preferably of greater than 0.7%, and/or of less than 6%, preferably of less than 4%, preferably of less than 3%, preferably of less than 2%, preferably of less than 1.5%; and/or a content of $TiO_2$ of greater than 0.1%, preferably of greater than 0.2%, preferably of greater than 0.3%, preferably of greater than 0.5%, and/or of less than 3%, preferably of less than 2.5%, preferably of less than 2%; and/or a content of $Al_2O_3$ of greater than 0.1%, and/or of less than 2.5%, preferably of less than 2%, preferably of less than 1.5%, preferably of less than 1%; and/or a total content of $TiO_2+Al_2O_3$ of greater than 0.2%, preferably of greater than 0.3%, preferably of greater than 0.4%, and/or of less than 2.5%, preferably of less than 2%; and/or a $CaO/SiO_2$ ratio by weight of greater than 0.4 and/or of less than 6.5, preferably of less than 6, preferably of less than 5.5, preferably of less than 5, preferably of less than 4,5, preferably of less than 4, preferably of less than 3.5, preferably of less than 3, preferably of less than 2.5, preferably of less than 2, preferably of less than 1.5, preferably of less than 1.3, indeed even of less than 1; and/or a $TiO_2/CaO$ ratio by weight of greater than 0,3, preferably of greater than 0.4, preferably of greater than 0.5, preferably of greater than 0.6, preferably of greater than 0.7, and/or of less than 1.4, preferably of less than 1.3, preferably of less than 1.2; and/or a content of constituents other than iron oxides, CaO, $SiO_2$, $TiO_2$ and $Al_2O_3$ of less than 4%, preferably of less than 3%, preferably of less than 2%, preferably of less than 1.5%, indeed even of less than 1%.

In one embodiment, the content of manganese oxide, expressed in the MnO form, is greater than 0.1%, indeed even greater than 0.2%, indeed even greater than 0.4%, and/or less than 3%, preferably less than 2.5%, preferably less than 2%, preferably less than 1.5%, indeed even less than 1%.

The relative density of the material is preferably greater than 90%, preferably greater than 91%, preferably greater than 92%, preferably greater than 93%, indeed even greater than 94%. A person skilled in the art knows how to modify the relative density of a sintered material, in particular by adjusting the particle size distribution of the powders used and the parameters of the manufacturing process, in particular the sintering temperature and/or the amount of the binders and/or the nature of the binders, and/or the pressure, if the shaping involves a pressing;
the pressure, and the dimensions and the shape of the die, if the shaping involves an extrusion.

The apparent density of the material is preferably greater than 4,60 g/cm³, preferably greater than 4.65 g/cm³, preferably greater than 4.70 g/cm³, preferably greater than 4.80 g/cm³, preferably greater than 4.90 g/cm³.

The mean size of the grains of the material is preferably less than 100 μm, preferably less than 90 μm, preferably less than 80 μm, preferably less than 60 μm, preferably less than 50 μm, preferably less than 40 μm, preferably less than 30 μm and/or greater than 0.2 μm, preferably greater than 0.5 μm.

The amount of hematite phase in the material, as percentage by weight based on the weight of the crystalline phases, measured by X-ray diffraction, is preferably greater than 50%, preferably greater than 70%, preferably greater than 80%, preferably greater than 85%.

Powder

The material according to the invention may be in the form of a particle or of a powder of particles.

The size of the particles of a powder according to the invention may in particular be greater than 0.01 μm, indeed even greater than 0.1 μm, indeed even greater than 0.5 μm, indeed even greater than 1 μm, indeed even greater than 10 μm, indeed even greater than 50 μm, indeed even greater than 100 μm, indeed even greater than 0.2 mm, indeed even greater than 0.25 mm, and/or less than 20 mm, preferably less than 15 mm, preferably less than 10 mm, indeed even less than 8 mm, indeed even less than 5 mm, indeed even less than 4 mm.

In one embodiment, a powder according to the invention exhibits a minimum size ($D_{0.5}$) of greater than 50 μm.

Particulate Mixture

A particulate mixture according to the invention preferably comprises:

(a) more than 60%, more than 65%, indeed even more than 70%, of aggregate particles, as percentage by weight, more than 90%, preferably more than 95%, preferably more than 98%, preferably substantially 100%, of said aggregate particles, as percentage by weight, being particles according to the invention;

(b) more than 15%, indeed even more than 20%, of matrix particles, as percentage by weight;

the particulate mixture comprising more than 5% by weight of aggregate particles exhibiting a size of greater than 1 mm and preferably of less than 15 mm.

The maximum size of the particulate mixture is preferably less than 10 mm, preferably less than 5 mm.

In one embodiment, more than 60%, preferably more than 70%, preferably more than 90%, preferably more than 95%, preferably more than 99%, of the particles of the particulate mixture, as percentage by weight, are made of a material according to the invention.

In particular, when it is intended to be used as starting substance for the manufacture of a sintered part, a particulate mixture according to the invention may comprise, as complement to 100% of the iron oxides, of CaO, of $SiO_2$, of $TiO_2$ and of $Al_2O_3$, more than 0.1% and/or less than 6% of a shaping additive, as percentage by weight.

Matrix Fraction of the Particulate Mixture

The matrix fraction may be formed, preferably for more than 90%, preferably more than 95%, preferably substantially 100%, as percentage by weight, of alumina particles and/or zirconia particles and/or magnesia particles and/or zircon particles and/or particles of iron oxide(s) and/or titanium oxide particles and/or silica particles and/or lime particles and/or particles comprising several of said oxides (alumina, zirconia, magnesia, zircon, iron oxide(s), titanium oxide, silica, lime).

The matrix fraction may be formed for more than 90%, preferably more than 95%, indeed even substantially 100%, of alumina particles and/or iron oxide particles and/or titanium oxide particles and/or silica particles and/or lime particles and/or particles comprising several of said oxides.

In one embodiment, more than 50%, preferably more than 70%, preferably more than 90%, preferably more than 95%, preferably more than 99%, of the matrix particles are made of a, preferably sintered, material according to the invention.

In one embodiment, the matrix fraction exhibits the following chemical analysis, as percentages by weight based on the oxides of the matrix fraction:

iron oxide(s), expressed in the $Fe_2O_3$ form, ≥85%,
CaO≤6%, and
$SiO_2$: 0.1%-6%, and
$TiO_2$: 0.1%-6%, and $Al_2O_3 \leq 2\%$, and
other oxides: $\leq 5\%$,
the $CaO/SiO_2$ ratio by weight being less than 1, and
the $CaO/TiO_2$ ratio by weight being less than 1.

Preferably, the matrix fraction of this embodiment exhibits one or more of the following optional characteristics:
- a content of iron oxide, expressed in the $Fe_2O_3$ form, of greater than 88%, preferably of greater than 90%, preferably of greater than 92%, preferably of greater than 94%, preferably of greater than 95%; and/or
- a content of CaO of greater than 0.2%, indeed even of greater than 0.3%, and/or of less than 4%, preferably of less than 3%, preferably of less than 2%, preferably of less than 1%; and/or
- a content of $SiO_2$ of greater than 0.2%, preferably of greater than 0.4%©, preferably of greater than 0.5%, preferably of greater than 0.7%, and/or of less than 5%, preferably of less than 4%, preferably of less than 3%, preferably of less than 2%, preferably of less than 1.5%; and/or
- a content of $TiO_2$ of greater than 0.1%, preferably of greater than 0.2%, and/or of less than 2%, preferably of less than 1.5%, preferably of less than 1%, preferably of less than 0.5%; and/or
- in one embodiment, a content of $Al_2O_3$ of greater than 0.1%, and/or of less than 1.8%, preferably of less than 1.5%, preferably of less than 1%, preferably of less than 0.5%; and/or
- a $CaO/SiO_2$ ratio by weight of greater than 0.4 and/or of less than 0.9, preferably of less than 0.8; and/or
- a $CaO/TiO_2$ ratio by weight of greater than 0.5; and/or
- a content of other oxides of less than 4%, preferably of less than 3%, preferably of less than 2%, preferably of less than 1.5%, indeed even of less than 1%.

In one embodiment, the matrix fraction exhibits the following chemical analysis, as percentages by weight based on the oxides of the matrix fraction:
iron oxide(s), expressed in the $Fe_2O_3$ form, $\geq 85\%$,
CaO: 0.1%-6%, and
$SiO_2$: 0.1%-6%, and
$0.05\% < TiO_2$, and
$0 \leq Al_2O_3$, and
$TiO_2+Al_2O_3 \leq 3\%$, and
other oxides 5. 5%,
the $CaO/SiO_2$ ratio by weight being between 0.2 and 7, and
the $TiO_2/CaO$ ratio by weight being between 0.2 and 1.

Preferably, the matrix faction of this embodiment exhibits one or more of the following optional characteristics:
- a content of iron oxide, expressed in the $Fe_2O_3$ form, of greater than 88%, preferably of greater than 90%, preferably of greater than 92%, preferably of greater than 94%, preferably of greater than 95%, preferably of greater than 97%; and/or
- a content of CaO of greater than 0.2%, indeed even of greater than 0.3%, and/or of less than 4%, preferably of less than 3%, preferably of less than 2%, preferably of less than 1%; and/or
- a content of $SiO_2$ of greater than 0.2%, preferably of greater than 0.4%, preferably of greater than 0.5%, preferably of greater than 0.7%, and/or of less than 5%, preferably of less than 4%, preferably of less than 3%, preferably of less than 2%, preferably of less than 1.5%; and/or
- a content of $TiO_2$ of greater than 0.3%, preferably of greater than 0.5%, and/or of less than 3%, preferably of less than 2,5%, preferably of less than 2%; and/or
- a total content of $TiO_2+Al_2O_3$ of greater than 0.2%, preferably of greater than 0.3%, preferably of greater than 0.4% and/or of less than 2.5%, preferably of less than 2%; and/or
- in one embodiment, a content of $Al_2O_3$ of greater than 0.1%, and/or of less than 2.5%, preferably of less than 2%, preferably of less than 1.5%, preferably of less than 1%; and/or
- a $CaO/SiO_2$ ratio by weight of greater than 0.4 and/or of less than 6.5, preferably of less than 6, preferably of less than 5.5, preferably of less than 5, preferably of less than 4.5, preferably of less than 4, preferably of less than 3.5, preferably of less than 3, preferably of less than 2.5, preferably of less than 2, preferably of less than 1.5, preferably of less than 1.3, indeed even of less than 1; and/or
- a $TiO_2/CaO$ ratio by weight of greater than 0.3, preferably of greater than 0.4, preferably of greater than 0.5; and/or
- a content of "other oxides" of less than 4%, preferably of less than 3%, preferably of less than 2%, preferably of less than 1.5%, indeed even of less than 1%.

Process for the Manufacture of a Sintered Product According to the Invention

A particulate mixture according to the invention may advantageously be used to manufacture a sintered product exhibiting aggregates bonded by a binding matrix. To this end, a process comprising the stages A) to C) described above may be employed.

In stage A), a starting feedstock comprising a particulate mixture according to the invention is prepared as a function of the composition desired and of the particle size distribution desired.

The Andreasen or Fuller-Bolomey packing models may be used to adapt the particle size distribution of the particulate mixture to the apparent density desired for the sintered product according to the invention. Such packing models are described in particular in the work entitled "*Traité de ceramiques et materiaux mineraux*" [Treatise on Ceramics and Inorganic Materials], C. A. Jouenne, published by Septima, Paris (1984), pages 403 to 405.

Preferably, the starting feedstock contains a shaping additive, preferably introduced in a dry form and preferably in an amount of greater than 0.1% and less than 7%, preferably less than 5%, preferably less than 3%, indeed even less than 2%, as percentage by weight based on the weight of the particulate mixture devoid of shaping additive.

The shaping additive may in particular be chosen from the group consisting of:
- clays;
- plasticizers, such as polyethylene glycol (or "PEG") or polyvinyl alcohol (or "PVA");
- cements, preferably high alumina cements;
- hydratable aluminas, such as boehmite;
- phosphates, preferably aluminum phosphates,
- sodium and/or potassium silicates;
- geopolymers;
- binders, including temporary organic binders, such as organic resins, lignosulfonates, carboxyrnethylcellulose, dextrin and alginates;
- deflocculants, such as alkali metal polyphosphates, alkali metal polyacrylates, or polycarboxylates;
- the mixtures of these products.

Preferably, the shaping additive is chosen from the group consisting of cements, deflocculants, clays, lignosulfonates, PVA and their mixtures.

When the shaping additive is introduced in the form of particles, these particles, of course, form part of the particulate mixture.

The particulate mixture may be delivered ready-for-use. Preferably, it is dry and contains the shaping additive. It is then sufficient to mix it with a solvent, preferably water, in order to prepare the starting feedstock.

The amount of solvent depends on the technology used in stage B).

In the case of a shaping by cold pressing, an addition of an amount of water of between 1.5% and 4%, as percentage by weight based on the particulate mixture, is preferred. In the case of a shaping involving a hydraulic binder, for example a casting, an addition of an amount of water of between 3% and 7%, as percentage by weight based on the particulate mixture, is preferred.

In stage B), the starting feedstock may be poured into a mold, in order to be shaped and transformed into a preform according to conventional techniques, for example by pressing.

After stage B) and before stage C), the preform may undergo a drying stage, in order to remove a portion of the water which has been used for the shaping, Such a stage is fully known to a person skilled in the art.

In stage C), the sintering conditions, and in particular the sintering temperature, depend on the composition of the preform, Usually, a sintering temperature of between 1200° C. and 1500° C., preferably of between 1200° C. and 1350° C., is well suited.

On conclusion of stage C), a sintered product according to the invention is obtained.

The properties of this sintered product render it particularly well suited to use in a thermal storage unit, Sintered Product According to the Invention A sintered product according to the invention preferably exhibits the shape of a block, all the dimensions of which are greater than 1 mm, greater than 5 mm, greater than 5 cm, and all the dimensions of which are preferably less than 150 cm, indeed even less than 100 cm, indeed even less than 60 cm. It preferably exhibits a weight of greater than 1 kg, of greater than 5 kg, indeed even of greater than 10 kg.

More preferably, the sintered product according to the invention exhibits:
- an apparent density of greater than 4 g/cm$^3$, preferably of greater than 4.1 g/cm$^3$, preferably of greater than 4.2 g/cm$^3$, indeed even of greater than 4,3 g/cm$^3$, indeed even of greater than 4.4 g/cm$^3$; and/or
- the following chemical analysis, as percentages by weight based on the oxides and for a total equal to 100%:
  - $Fe_2O_3$>85%, preferably >88%, preferably >90%, preferably >92%, preferably >94%,
  - CaO>0.1%, preferably >0,2%, preferably >0.3% and preferably <4%, preferably <3,5%, preferably <3%, preferably <2.5%, preferably <2%, preferably <1.5%, preferably <1%,
  - $SiO_2$>0.1%, preferably >0.5%, preferably >0.8%, preferably >1% and preferably <4%, preferably <3.5%, preferably <3%, preferably <2.5%, preferably <2%,
  - $TiO_2$>0.1%, preferably >0.2%, indeed even >0.5%, indeed even >0,8% and preferably <4%, preferably <3.5%, preferably <3%, preferably <2.5%, preferably <2%, preferably <1.5%,
  - 0≤$Al_2O_3$≤3%, preferably >0.1%, preferably >0.2% and preferably <2.5%, preferably <2%, preferably <1.5%, preferably <1%,
  - other oxides 5%, preferably <4%, preferably <3.5%, preferably <3%, preferably <2.5%, preferably <2%, preferably <1.5%, preferably <1%; and/or
- a specific heat capacity at 800° C. of greater than 850 J/kg.K, preferably of greater than 900 J/kg.K, preferably of greater than 950 J/kg.K, measured by differential scanning calorimetry; and/or
- an amount of hematite phase, as percentage by weight based on the weight of the crystalline phases, measured by X-ray diffraction, of greater than 50%, preferably of greater than 70%, preferably of greater than 80%, preferably of greater than 85%.

EXAMPLES

The following nonlimiting examples are given for the purpose of illustrating the invention.

Characterizations

The apparent density is measured by impregnation, according to the principle of the buoyancy method.

The absolute density is measured by helium pycnometry after grinding.

The chemical analysis of the products is measured by "Inductively Coupled Plasma" or ICP for the elements present in an amount not exceeding 0.5%. In order to determine the content of the other elements, a bead of the material to be analyzed is manufactured by melting the material and then the chemical analysis is carried out by X-ray fluorescence.

The mean size of the grains of the materials is measured by the "Mean Linear Intercept" method. A method of this type is described in the standard ASTM E1382. According to this standard, analysis lines are plotted on images of the material and then, along each analysis line, the lengths, referred to as "intercepts", between two consecutive grain boundaries cutting said analysis line are measured.

The mean length "I" of the intercepts "I " is subsequently determined.

For the materials of the examples, intercepts were measured on images, obtained by scanning electron microscopy, of samples of materials, the sections having been polished beforehand until a mirror quality is obtained. The magnification used for taking the images is chosen so as to display approximately 40 grains on an image, 5 images per material were produced.

The mean size "d" of the grains of a material is given by the relationship: d=1.56×I'. This formula results from formula (13) of "Average Grain Size in Polycrystalline Ceramics", M. I. Mendelson, J. Am. Cerm. Soc., Vol. 52, No. 8, pp 443-446.

Preparation of the Examples

The following starting substances were used:
- a hematite powder Rouges Oxyde de Fer 130, sold by Colorey SAS, which exhibits a content by weight of $Fe_2O_3$ of greater than 99%, and a median size equal to 0.7 (for examples 1 and 2);
- a ground calamine powder exhibiting the following chemical analysis: iron oxide, expressed in the $Fe_2O_3$ form=96,2%, $SiO_2$=1.3%, CaO=0.8%, other oxides=1.7%, and a median size equal to 6 µm (for examples 3 to 10). Said ground calamine powder did not contain $TiO_2$;

a silica powder 971 D sold by Elkem (for examples 1, 2 and 10);

an anatase $TiO_2$ powder sold by Altichem, exhibiting a content by weight of $TiO_2$ of greater than 98.3% and a median size equal to 0.5 μm (for examples 2, and 4 to 10);

a calcium carbonate powder Mikhart sold by Provencale S.A., exhibiting a $CaCO_3$ purity of greater than 98% and a median size equal to 1.5 μm (for examples 1, 2, 9 and 10).

For each of the examples, the mixture of the starting substances which is used appears in the following table 1.

TABLE 1

| Example | Hematite powder | Ground calamine powder | Silica powder | Anatase $TiO_2$ powder | $CaCO_3$ powder |
|---|---|---|---|---|---|
| 1 | 98.1 | — | 1 | — | 0.9 |
| 2 | 97.6 | — | 1 | 0.5 | 0.9 |
| 3 | — | 100 | — | — | — |
| 4 | — | 99.7 | — | 0.3 | — |
| 5 | — | 99.5 | — | 0.5 | — |
| 6 | — | 99.2 | — | 0.8 | — |
| 7 | — | 99 | — | 1 | — |
| 8 | — | 98 | — | 2 | — |
| 9 | — | 98 | — | 1 | 1 |
| 10 | — | 87.9 | 4.1 | 1 | 7 |

For each example, the powders of oxides were mixed with 0.5% of PEG 400 used as shaping additive and 0.5% of water for examples 1 and 2 and 1% for examples 3 to 10, as percentages based on the mixture of powders of oxides.

The wet mixture was then pressed isostatically under cold conditions at 2000 bar for 5 minutes in the form of parts with a diameter equal to 100 mm and with a height equal to 200 mm.

These parts were subsequently sintered at a stationary phase temperature of 1275° C., the time for maintenance at the stationary phase being equal to 5 hours, under air, the rate of rise being 80° C/h. After the stationary temperature phase, the temperature was reduced, the rate of fall being 80° Cih down to 800° C., the fall in temperature subsequently being free down to ambient temperature.

The results obtained are summarized in the following table 2.

Results

The improvement in the relative density is the following ratio: 100*(relative density of the product under consideration—relative density of the reference product?/relative density of the reference product.

The reference product is the product of example 1 for the product of example 2 and the product of example 3 for the products of examples 3 to 10.

The inventors consider that a significant improvement in the relative density is obtained when this improvement is greater than or equal to 0.5%.

A comparison of examples 1 et 2 shows that, for one and the same $CaO/SiO_2$ ratio equal to 0.50, the addition of $TiO_2$ in an amount such that the $TiO_2/CaO$ ratio is equal to 1 makes possible an improvement in the relative density of 3.4%, the relative density being increased from 90.2% to 93.4%.

A comparison of examples 3 and 4 to 6 shows that, for one and the same $CaO/SiO_2$ ratio equal to 0.60, the addition of $TiO_2$ in amounts such that the $TiO_2/CaO$ ratio is equal to 0.50, 0.83 and 1.33, respectively, makes possible an improvement in the relative density of 1.07%, 0.75% and 0.54%, respectively, the relative density being increased from 92.5% to 93.5%, 93.2% and 93.0%, respectivement.

A comparison of examples 3 and 7 to 8 shows that, for one and the same $CaO/SiO_2$ ratio equal to 0.60, the addition of $TiO_2$ in amounts such that the $TiO_2/CaO$ ratio is equal to 1.67 and 3.33, respectively, causes a decline in the relative density of 3.47% and 6.32%, respectively, the relative density being reduced from 92.5% to 89.4% and 87.0%, respectivement.

A comparison of examples 3 and 9 shows that, for a content of $SiO_2$ equal to 1%, the combination of a reduction in the $CaO/SiO_2$ ratio from 1.10 to 0.60 and of an addition of $TiO_2$ in an amount such that the $TiO_2/CaO$ ratio is equal to 0.91 makes possible an improvement in the relative density of 2.49%.

A comparison of examples 3 and 10 shows that the combination of an increase in the content of CaO to 4.5%, of an increase in the $CaO/SiO_2$ ratio to 0.88 and of an addition of $TiO_2$ in an amount such that the $TiO_2/CaO$ ratio is equal to 0.22 makes possible an improvement in the relative density of 2.38%.

TABLE 2

| Ex. | $Fe_2O_3$ (%) | CaO (%) | $SiO_2$ (%) | $TiO_2$ (%) | $Al_2O_3$ (%) | $Al_2O_3$ + $TiO_2$ (%) | Other oxides total (%) | including MnO (%) | CaO/ $SiO_2$ | $TiO_2$/ CaO | Relative density (%) | % Improvement in the relative density | % Improvement in the relative density | Mean size of grains (μm) |
|---|---|---|---|---|---|---|---|---|---|---|---|---|---|---|
| 1 | 98.4 | 0.5 | 1 | 0 | 0 | 0 | 0.1 | 0 | 0.50 | 0.00 | 90.2 | ref. | — | 15 |
| 2 | 97 | 0.5 | 1 | 0.5 | 0 | 0.5 | 1 | 0 | 0.50 | 1.00 | 93.4 | 3.4 | — | 30 |
| 3 | 97.1 | 0.6 | 1 | 0 | 0.2 | 0.2 | 1.1 | 0.8 | 0.60 | 0.00 | 92.5 | — | ref. | <30 |
| 4 | 96.8 | 0.6 | 1 | 0.3 | 0.2 | 0.5 | 1.1 | 0.8 | 0.60 | 0.50 | 93.5 | — | 1.07 | nd |
| 5 | 96.6 | 0.6 | 1 | 0.5 | 0.2 | 0.7 | 1.1 | 0.8 | 0.60 | 0.83 | 93.2 | — | 0.75 | nd |
| 6 | 96.3 | 0.6 | 1 | 0.8 | 0.2 | 1 | 1.1 | 0.8 | 0.60 | 1.33 | 93.0 | — | 0.54 | nd |
| 7 | 96.1 | 0.6 | 1 | 1 | 0.2 | 1.2 | 1.1 | 0.8 | 0.60 | 1.67 | 89.4 | — | −3.47 | <20 |
| 8 | 95.1 | 0.6 | 1 | 2 | 0.2 | 2.2 | 1.1 | 0.8 | 0.60 | 3.33 | 87.0 | — | −6.32 | <15 |
| 9 | 95.6 | 1.1 | 1 | 1 | 0.2 | 1.2 | 1.1 | 0.8 | 1.10 | 0.91 | 94.8 | — | 2.49 | nd |
| 10 | 88.1 | 4.5 | 5.1 | 1 | 0.3 | 1.3 | 1 | 0.7 | 0.88 | 0.22 | 94.7 | — | 2.38 | nd | nd: not determined

The product of example 2 was subsequently ground and graded with regard to particle size into the three following particle size categories: 1.5 to 3.5 mm, 0.5 to 1.5 mm and less than 0.5 mm.

The three powders thus obtained were mixed with:
- hematite powder described above or with a calcined calamine powder, and
- anatase powder described above.

The calcined calamine powder was obtained by calcination of the calamine powder described above, by a heat treatment under air comprising maintenance at a temperature equal to 900° C. for 4 hours, said temperature being the maximum temperature reached during this heat treatment.

The particulate mixtures according to the invention which are produced are summarized in the following table 3:

TABLE 3

| Particulate mixture | Powder of example 2 1.5-3.5 mm | Powder of example 2 0.5-1.5 mm | Powder of example 2 <0.5 mm | Hematite powder | Calamine powder | Anatase powder |
|---|---|---|---|---|---|---|
| M1 | 28 | 22 | 30 | 20 | — | — |
| M2 | 24 | 32 | 24 | — | 19.5 | 0.5 |

The particulate mixtures were mixed with 2.4% of water, 1% of calcium lignosulfonate and 1% of RR40BR clay sold by Imerys. The mixtures obtained were subsequently pressed in the form of bricks, with dimensions of 230 mm×114 mm×64 mm, using a uniaxial press at a pressure equal to 0.7 tonnes/cm$^2$.

The bricks obtained were subsequently dried at 110° C. for 24 hours and then sintered in a cycle at a stationary temperature phase of 1225° C., the time for maintenance at the stationary phase being equal to 8 hours, under air, the rate of temperature rise being 50° C./h. After the stationary temperature phase, the temperature was reduced, the rate of fall being 50° C./h down to 800° C., the fall in temperature subsequently being free down to ambient temperature.

The results obtained are presented in the following table 4:

TABLE 4

| Particulate mixture shaped and sintered | Apparent density (g/cm$^3$) | % Fe$_2$O$_3$ | % CaO | % TiO$_2$ | % SiO$_2$ | % others |
|---|---|---|---|---|---|---|
| M1 | 4.14 | 95.7 | 0.60 | 0.25 | 1.45 | 2.00 |
| M2 | 4.28 | 95.0 | 0.65 | 0.90 | 1.45 | 2.00 |

These sintered products, which are particularly dense and which exhibit a high specific heat capacity, are thus perfectly suited to being used as heat energy storage element in a thermal storage unit, in particular in the form of bricks, as described in the application FR 3 026 473 published on Jan. 4, 2016.

As is now clearly apparent, the invention provides a refractory material perfectly suitable for the manufacture of an energy storage element.

Of course, the invention is not limited to the embodiments described, which are provided by way of illustration and without limitation.

The invention claimed is:

1. A sintered material having the following chemical composition, as percentages by weight:
   iron oxide(s), expressed in the Fe$_2$O$_3$ form, >92%,
   CaO: 0.1%-6%, and
   SiO$_2$: 0.1%-6%, and
   0.05%≤TiO$_2$, and
   0≤Al$_2$O$_3$, and
   TiO$_2$+Al$_2$O$_3$≤3%, and
   constituents other than iron oxides, CaO, SiO$_2$, TiO$_2$ and Al$_2$O$_3$: ≤5%, the CaO/SiO$_2$ ratio by weight being between 0.2 and 7, the TiO$_2$/CaO ratio by weight being between 0.2 and 1.5.

2. The sintered material as claimed in claim 1, having a relative density of greater than or equal to 90%.

3. The sintered material as claimed claim 1, exhibiting a mean grain size of less than 100 μm and greater than 0.5 μm.

4. The sintered material as claimed in claim 1, comprising, as percentages by weight:
   a content of CaO of greater than 0.2% and less than 4%; and/or
   a content of SiO$_2$ of greater than 0.2% and less than 6%; and/or
   a content of TiO2 of greater than 0.1% and less than 3%; and/or
   a content of Al$_2$O$_3$ of greater than 0.1% and less than 2.5%; and/or
   a total content of TiO$_2$+Al$_2$O$_3$ of greater than 0.2% and less than 2.5%; and/or
   a CaO/SiO$_2$ ratio by weight of greater than 0.4 and less than 6.5; and/or
   a TiO$_2$/CaO ratio by weight of greater than 0.3 and less than 1.4; and/or
   a content of constituents other than iron oxides, CaO, SiO$_2$, TiO$_2$ and Al$_2$O$_3$ of less than 4%; and/or
   a content of manganese oxide, expressed in the MnO form, of greater than 0.1% and less than 3%.

5. The sintered material as claimed in claim 4, comprising, as percentages by weight:
   a content of CaO of greater than 0.3% and less than 2%; and/or
   a content of SiO$_2$ of greater than 0.4% and less than 3%; and/or
   a content of TiO$_2$ of greater than 0.3% and less than 2.5%; and/or
   a content of Al$_2$O$_3$ of greater than 0.1% and less than 1.5%; and/or
   a total content of TiO$_2$+Al$_2$O$_3$ of greater than 0.3% and less than 2%; and/or
   a CaO/SiO$_2$ ratio by weight of greater than 0.4 and less than 5; and/or
   a TiO$_2$/CaO ratio by weight of greater than 0.5 and less than 1.3; and/or
   a content of constituents other than iron oxides, SiO$_2$, TiO$_2$ and Al$_2$O$_3$ of
   less than 2%; and/or
   a content of manganese oxide, expressed in the MnO form, of greater than 0.2%
   and less than 2%.

6. The sintered material as claimed in claim 5, comprising, as percentages by weight:

a content of iron oxide, expressed in the $Fe_2O_3$ form, of greater than 95%; and/or a content of CaO of greater than 0.3% and less than 1%; and/or a content of $SiO_2$ of greater than 0.7% and less than 2%; and/or a content of $TiO_2$ of greater than 0.5% and less than 2%; and/or a content of $Al_2O_3$ of greater than 0.1% and less than 1%; and/or a total content of $TiO_2+Al_2O_3$ of greater than 0.4%; and less than 2%; and/or a $CaO/SiO_2$ ratio by weight of greater than 0.4 and less than 3; and/or a $TiO_2/CaO$ ratio by weight of greater than 0.7 and less than 1.2; and/or a content of constituents other than iron oxides, CaO, $SiO_2$, $TiO_2$ and $Al_2O_3$ of less than 1%; and/or a content of manganese oxide, expressed in the MnO form, of greater than 0.4% and less than 1%.

7. A particulate mixture, comprising, as percentages by weight:

(a) more than 60%, by weight, of aggregate particles having a size of greater than or equal to 50 µm, more than 90% by weight of said aggregate particles being particles made of the sintered material as claimed in claim 1;

(b) more than 15%, by weight, of matrix particles having a size of less than 50 µm;

the particulate mixture comprising more than 5% by weight of the aggregate particles having a size of greater than 1 mm.

8. The particulate mixture as claimed in claim 7, more than 60% of the particulate mixture, as percentage by weight, being made of the sintered material.

9. The particulate mixture as claimed in claim 8, more than 90% of the particulate mixture, as percentage by weight, being made of the sintered material.

10. The particulate mixture as claimed in claim 7, in which a matrix fraction, formed of the matrix particles, has the following chemical analysis, as percentages by weight based on the following oxides:

iron oxide(s), expressed in the $Fe_2O_3$ form, ≥85%,
CaO≤6%, and
$SiO_2$: 0.1%-6%, and
$TiO_2$: 0.1%-6%, and
$Al_2O_3$≤2%, and
other oxides: ≤5%,
the $CaO/SiO_2$ ratio by weight being less than 1, and
the $CaO/TiO_2$ ratio by weight being less than 1.

11. The particulate mixture as claimed in claim 7, in which a matrix fraction, formed of the matrix particles, has the following chemical analysis, as percentages by weight based on the following oxides:

iron oxide(s), expressed in the $Fe_2O_3$ form, ≥85%,
CaO: 0.1%-6%, and
$SiO_2$: 0.1%-6%, and
0.05%<$TiO_2$, and
0≤$Al_2O_3$, and
$TiO_2+Al_2O_3$≤3%, and
other oxides ≤5%,
the $CaO/SiO_2$ ratio by weight being between 0.2 and 7, and
the $TiO_2/CaO$ ratio by weight being between 0.2 and 1.

12. A sintered product obtained by sintering the particulate mixture as claimed in claim 7, wherein the sintering results in conversion of the matrix particles into a binding phase which bind together the aggregate particles and the aggregate particles are substantially unaffected by the sintering.

13. A thermal storage unit comprising heat energy storage elements, said heat energy storage elements being made of the sintered product as claimed in claim 12.

14. The thermal storage unit as claimed in claim 13, in which the heat energy storage elements are shaped and arranged so that said thermal storage unit comprises a void volume fraction of less than or equal to 60%.

15. An assembly comprising:
a thermal storage unit as claimed in claim 13, and
a device for circulation of a heat-exchange fluid through said thermal storage unit.

* * * * *